United States Patent
Hilburn et al.

(10) Patent No.: US 9,148,487 B2
(45) Date of Patent: Sep. 29, 2015

(54) METHOD AND SYSTEM FOR MANAGING DEVICE PROFILES

(75) Inventors: Joseph A. Hilburn, Frisco, TX (US); Scott J. Hoover, Allen, TX (US); Paul V. Hubner, McKinney, TX (US)

(73) Assignee: Verizon Patent and Licensing, Basking Ridge, NJ (US)

( * ) Notice: Subject to any disclaimer, the term of this patent is extended or adjusted under 35 U.S.C. 154(b) by 211 days.

(21) Appl. No.: 13/327,112

(22) Filed: Dec. 15, 2011

(65) Prior Publication Data

US 2013/0159476 A1 Jun. 20, 2013

(51) Int. Cl.
*G06F 15/177* (2006.01)
*H04L 29/08* (2006.01)
*H04W 4/00* (2009.01)
*H04W 4/02* (2009.01)

(52) U.S. Cl.
CPC ............ *H04L 67/303* (2013.01); *H04L 67/306* (2013.01); *H04W 4/001* (2013.01); *H04W 4/02* (2013.01)

(58) Field of Classification Search
CPC ....... H04L 63/10; H04L 41/22; H04L 67/306; H04W 4/001; H04W 4/02
See application file for complete search history.

(56) References Cited

U.S. PATENT DOCUMENTS

| | | | |
|---|---|---|---|
| 2002/0165846 A1* | 11/2002 | Richer et al. | 707/1 |
| 2004/0267887 A1* | 12/2004 | Berger et al. | 709/206 |
| 2007/0226321 A1* | 9/2007 | Bengtson | 709/219 |
| 2008/0275974 A1* | 11/2008 | Rackiewicz | 709/223 |
| 2008/0305832 A1* | 12/2008 | Greenberg | 455/557 |
| 2010/0319053 A1* | 12/2010 | Gharabally | 726/4 |
| 2011/0055399 A1* | 3/2011 | Tung et al. | 709/226 |
| 2011/0154491 A1* | 6/2011 | Hernacki | 726/23 |
| 2011/0179500 A1* | 7/2011 | Manning et al. | 726/31 |
| 2011/0295843 A1* | 12/2011 | Ingrassia et al. | 707/723 |
| 2012/0059780 A1* | 3/2012 | Kononen et al. | 706/14 |
| 2012/0096080 A1* | 4/2012 | Levesque et al. | 709/203 |
| 2013/0117806 A1* | 5/2013 | Parthasarathy et al. | 726/1 |

\* cited by examiner

*Primary Examiner* — Brian J Gillis
*Assistant Examiner* — Juan C Turriate Gastulo

(57) ABSTRACT

An approach for providing cloud-based profile access is described. A profile platform receives, at a cloud-based service platform, a request for a device profile from a mobile device, wherein the device profile specifies information relating to configuration of a graphical user interface and one or more applications associated with the mobile device, determines context data for the mobile device, selects one of a plurality of device profiles based on the determined context data, and generates a control message specifying the selected device profile for configuring the mobile device.

20 Claims, 8 Drawing Sheets

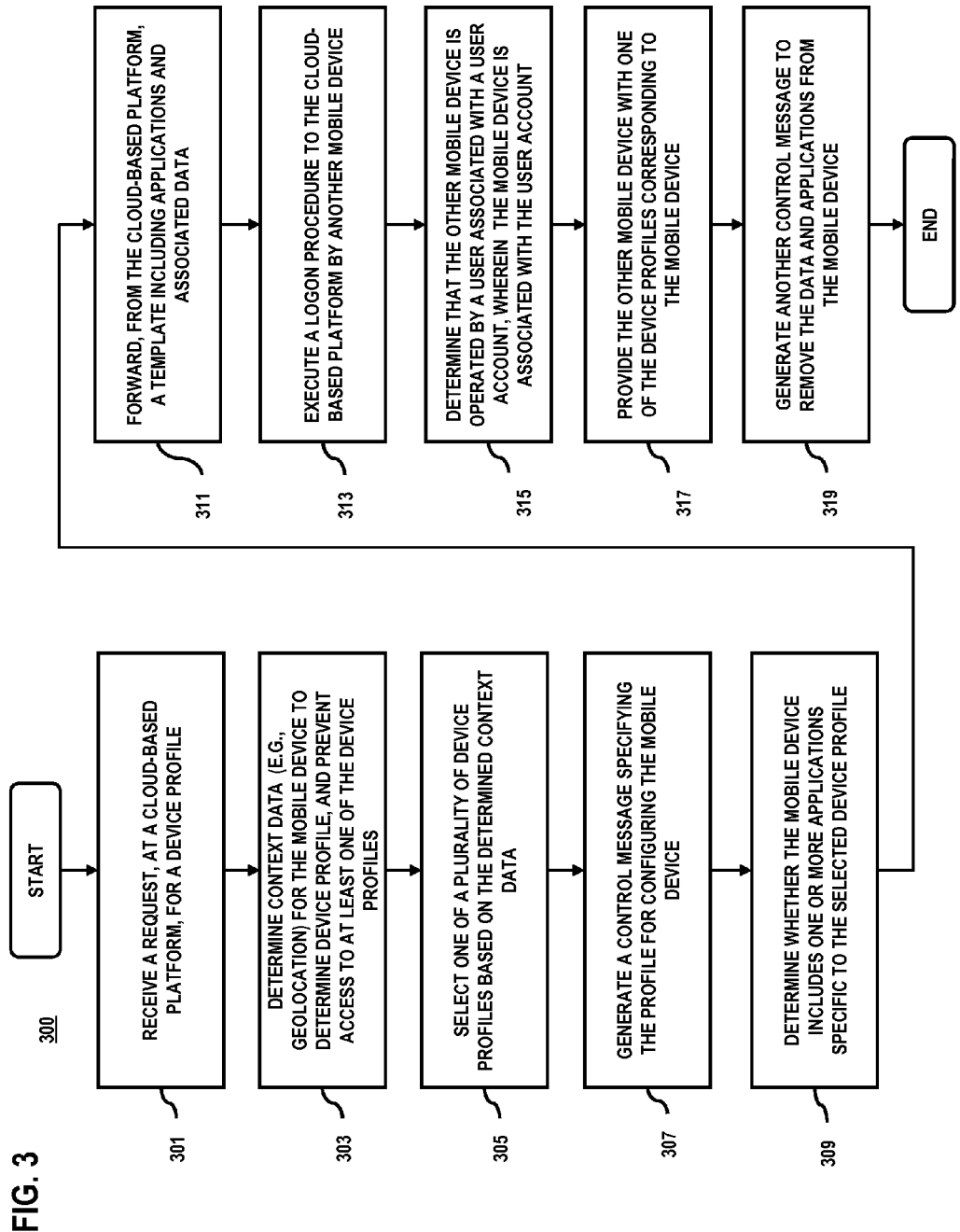

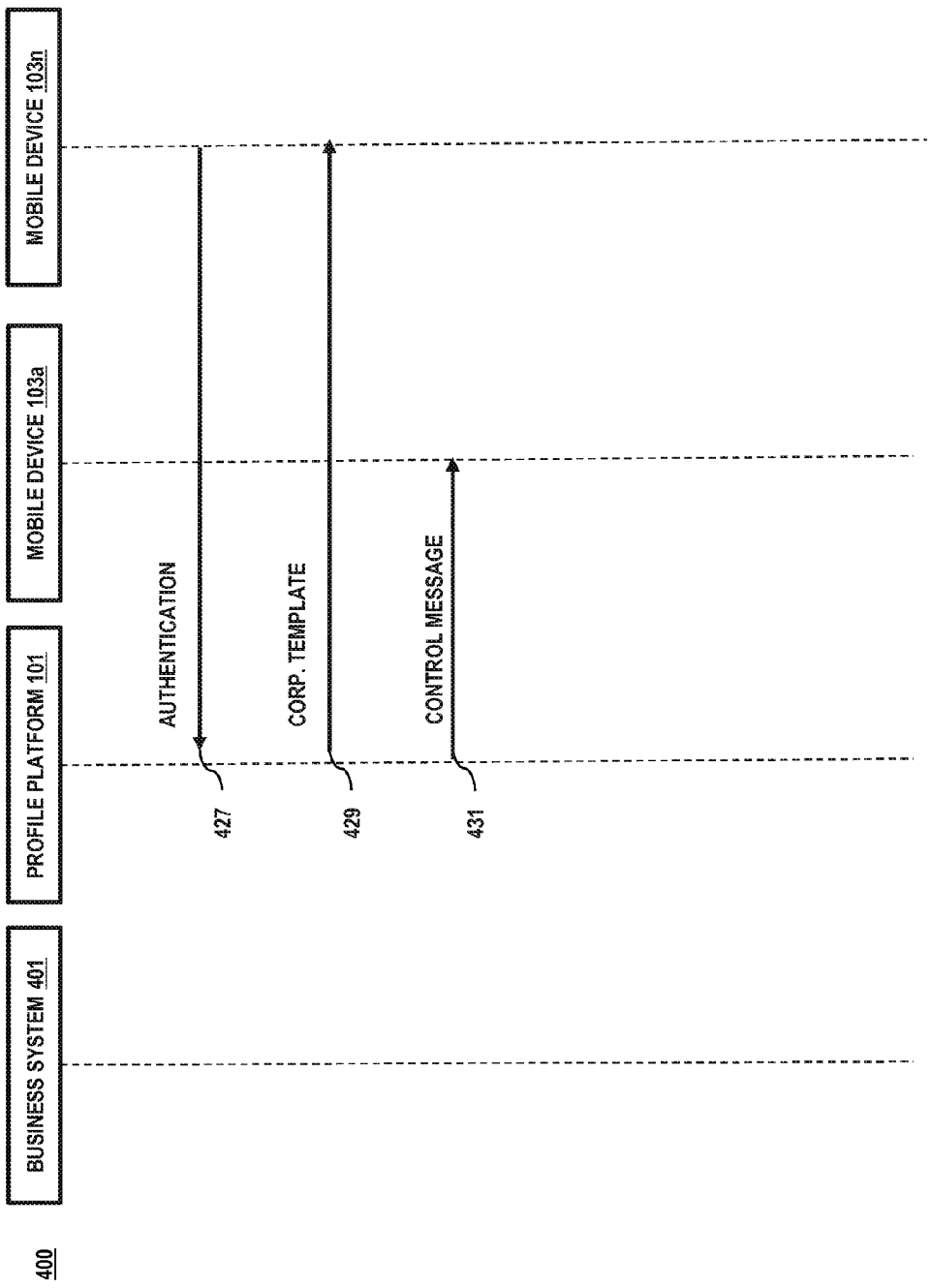

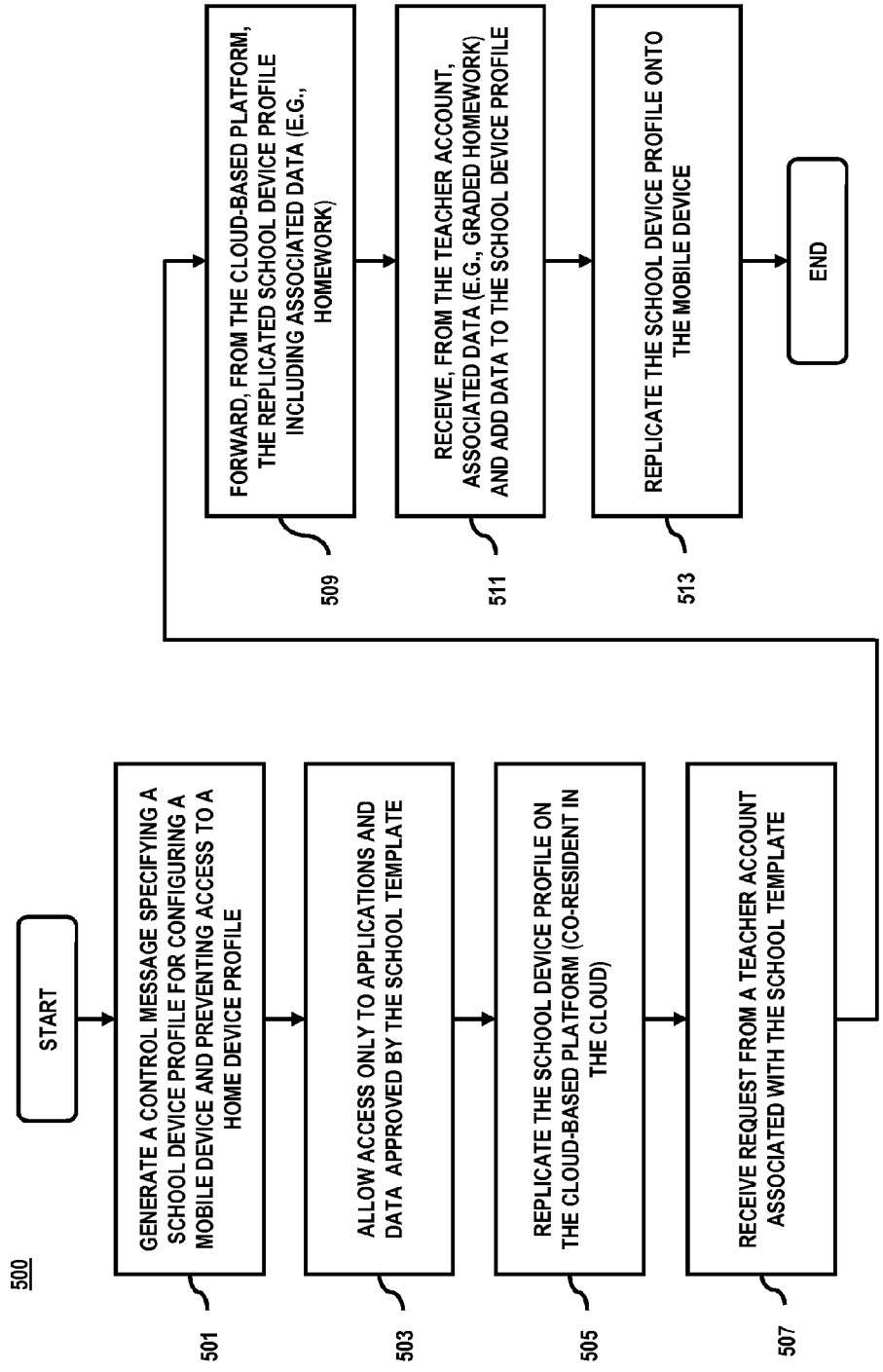

METHOD AND SYSTEM FOR MANAGING DEVICE PROFILES

BACKGROUND INFORMATION

Wireless networking technologies offer users the convenience of mobility and ease of connection to a network. As mobile devices continue to expand in functionality, so does the quantity information and applications stored on mobile devices. Users not only employ these devices for personal applications, e.g., social networking, personal finance, entertainment, but also for business. Thus, mobile devices often contain personal information, personal preferences, applications and associated data, as well as media files. Additionally, such devices are routinely utilized for work or other environments in which other types of data are stored and manipulated. Because mobile devices are used in a broad array of environments, it is becoming increasingly difficult for users to manage the abundance of applications and associated data. Consequently, inefficiencies in accessing these resources result, along with an increasing burdensome user experience.

Therefore, there is a need for an approach that provides convenient and efficient management of mobile device resources.

BRIEF DESCRIPTION OF THE DRAWINGS

Various exemplary embodiments are illustrated by way of example, and not by way of limitation, in the figures of the accompanying drawings in which like reference numerals refer to similar elements and in which:

FIG. 3 is a flowchart of a process for providing cloud-based profile access, according to an exemplary embodiment;

FIGS. 4A and 4B are ladder diagrams of a process for accessing a device profile, according to an exemplary embodiment;

FIG. 5 is a flowchart of a process using a group device profile to prevent access to applications, according to an exemplary embodiment;

DESCRIPTION OF THE PREFERRED EMBODIMENT

An apparatus, method and software for providing cloud-based profile access are described. In the following description, for the purposes of explanation, numerous specific details are set forth in order to provide a thorough understanding of the present invention. It is apparent, however, to one skilled in the art that the present invention may be practiced without these specific details or with an equivalent arrangement. In other instances, well-known structures and devices are shown in block diagram form in order to avoid unnecessarily obscuring the present invention.

Although the various exemplary embodiments are described with respect to cloud-computing services, it is contemplated that these embodiments have applicability to other service architectures.

Figure 1:
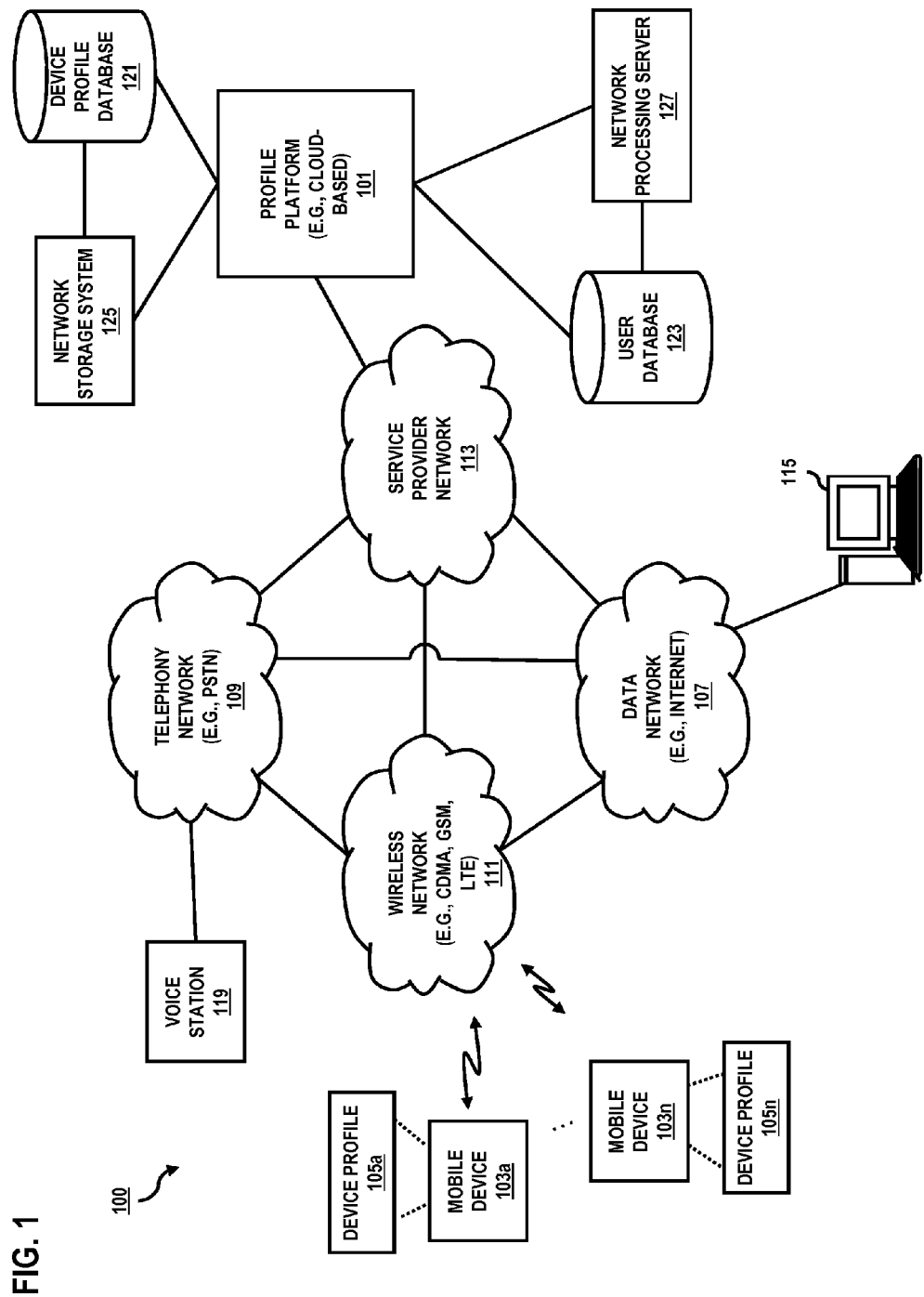
FIG. 1 is a diagram of a system capable of providing cloud-based profile access, according to an exemplary embodiment.

FIG. 1 is a diagram of a system capable of providing cloud-based profile access, according to an exemplary embodiment. For the purpose of illustration, the system 100 employs a profile platform 101 that is configured to provide cloud-based profile access services. As used herein, cloud-based services of platform 101 refers to services that involve computing resources, applications, and data access and storage. In this manner, cloud computing applications can effectively determine the necessary data within the cloud in support of the profile access service. The cloud-based profile access may, for instance, be initiated using one or more user devices (e.g., mobile devices 103 (or mobile devices 103a-103n)) over one or more networks (e.g., data network 107, telephony network 109, wireless network 111, service provider network 113, etc.). According to one embodiment, services including cloud-based profile access may be part of managed services supplied by a service provider (e.g., a wireless communication company) as a hosted or subscription-based service made available to users of the mobile devices 103 through a service provider network 113. For instance, profile platform 101 can process a request from mobile device 103a to determine a particular device profile. The device profile specifies information relating to configuration of a graphical user interface (GUI); in addition, such profile information can indicate one or more applications to be employed with the profile. Further, context data for the mobile device can be obtained to facilitate the selection of the device profile among multiple device profiles. The multiple profiles can correspond to respective environments and contexts, which may include work, school, home, travel, participation in an event (e.g., exercise, attending a sports event, etc.), and etc. The management of such profiles, in certain embodiments, can be assisted with the use of templates that are active only in the respective environments. Each template effectively specifies the particular resources (e.g., data and application (s)) appropriate for a particular environment. The templates can employ unique or overlapping resources available to the environments.

As shown, the profile platform 101 may be a part of or connected to the service provider network 113. According to another embodiment, the profile platform 101 may be include within or connected to the mobile devices 103, a computing device 115, etc. While specific reference will be made thereto, it is contemplated that the system 100 may embody many forms and include multiple and/or alternative components and facilities. Profile platform 101, in some embodiments, can provide cloud-based profile access to facilitate, for example, the sharing of a group device profile by one or more users, the recovery of a device profile 105 for mobile device upgrade or loss, and the enforcement of profile limitations (e.g., preventing gaming applications in a school environment).

In certain embodiments, the profile platform 101 may include or have access to device profiles 105 stored in a profile database 121. For example, the profile platform 101 may access the profile database 121 to acquire device profile information associated with one or more users of the mobile devices 103. Device profile information may include user information, data, template keys, and the like. User information may, for instance, include usernames, passwords, preferences (e.g., configuration and layout of a graphical user interface), personal contract information, history information and the like. Such data may also include user data, data relating to one or more applications associated with the mobile devices 103 including, organizational data, and the like. Template keys may include, for example, a structure of information authorizing access to applications and data associated with the template key. It is contemplated that the template keys may be configured to enable the template keys to be used by multiple manufacturers, and operating systems (e.g., ANDROID, BLACKBERRY OS, iOS, WINDOWS PHONE, WINDOWS, MAC OS, UNIX). Likewise, some or all of the device profile 105 information may be configured to enable use by multiple phone manufactures and operating systems.

In certain embodiments, the profile platform 101 may include or have access to user account information stored in a user database 123. For example, the profile platform 101 may access the user database 123 to authenticate logon credentials, store template data, and determine devices and device profiles 105 associated with the user account.

As shown, the profile platform 101, in certain embodiments, may utilize a server-based approach using a network storage system 125 (hereinafter NSS 125), and a network processing server 127 (hereinafter NPS 127). Under this scenario, the NSS 125 stores profiles and handles the distribution of such profiles. For example, the NSS 125 may create and modify profiles stored in the device profile database 121 to incorporate changes detected by mobile device 103a. Also, the NPS 127 can process the various datum to determine which profile or profiles should be active. That is, the NPS 127 may process the context data for the mobile device 103a to facilitate the selection of the device profile and access the user database 123 to determine select a device profile 105. It is contemplated that the functions of the NSS 125 and NPS 127 may be subsumed by the profile platform 101.

As mentioned, recent developments have increased the quantity and quality of information stored on mobile devices. By way of example, this stored information may include personal information (e.g., names, address, phone numbers), personal preferences (e.g., configuration and layout of a graphical user interface), application data (e.g., games), and media files (e.g., music, video, productivity files), and the like. However, this data may be difficult to transfer when users upgrade mobile devices, for example, mobile devices may have incompatible hardware (e.g., communication connections), and software (e.g., operating system). Additionally, users may wish to prevent commingling of data. For example, users may prefer to have work related data separate from personal data.

To address this issue, the system 100 of FIG. 1 introduces the capability to control data, applications, and user information using a cloud-based platform. By way of example, mobile device 103 users can benefit from the services of profile platform 101, whereby a device profile 105 including personal information, personal preferences, application data, and media files is stored in a cloud-based platform, and controlled by use of a control message. The profile platform 101 may be configured to support multiple device profiles (e.g., device profile 105a, 105n) on a single mobile device 103 to prevent the comingling of data. Moreover, the profile platform 101 may be configured to determine context data relating to an environmental setting of the mobile device 103 to enable the selection of a device profile 105. Furthermore, profile platform 101 may be configured to support group device profiles (e.g., device profile 105) provided to a community of mobile devices 103 to support sharing of group applications and data among multiple users. The community can be formed or designated based on organization, user interest, social network relationships, etc. The group device profile (e.g., device profile 105) may be configured to include context based device profiles 105 that prevent users from accessing personal profiles during a predefined context (e.g., near a school facility, during school hours, etc.).

By way of example, mobile devices 103 may be any type of mobile terminal including a mobile handset, mobile station, mobile unit, multimedia computer, multimedia tablet, communicator, netbook, Personal Digital Assistants (PDAs), smartphone, media receiver, etc. It is also contemplated that the mobile devices 103 may support any type of interface for supporting the presentment or exchange of data. In addition, mobile devices 103 may facilitate various input means for receiving and generating information, including touch screen capability, keyboard and keypad data entry, voice-based input mechanisms, accelerometer (e.g., shaking the mobile device 103), and the like. Any known and future implementations of mobile devices 103 are applicable. It is noted that, in certain embodiments, the mobile devices 103 may be configured to detect context data using a variety of technologies—i.e., near field communication (NFC), Bluetooth, infrared, etc. Also, connectivity may be provided via a wireless local area network (LAN). By way of example, a group of mobile devices 103 may be configured to a common LAN so that each device can be uniquely identified via any suitable network addressing scheme. For example, the LAN may utilize the dynamic host configuration protocol (DHCP) to dynamically assign "private" DHCP internet protocol (IP) addresses to each mobile device 103, i.e., IP addresses that are accessible to devices connected to the service provider network 113 as facilitated via a router.

In some embodiments, the profile platform 101, the mobile devices 103, and other elements of the system 100 may be configured to communicate via the service provider network 113. According to certain embodiments, one or more networks, such as the data network 107, the telephony network 109, and/or the wireless network 111, may interact with the service provider network 113. The networks 107-113 may be any suitable wireline and/or wireless network, and be managed by one or more service providers. For example, the data network 107 may be any local area network (LAN), metropolitan area network (MAN), wide area network (WAN), the Internet, or any other suitable packet-switched network, such as a commercially owned, proprietary packet-switched network, such as a proprietary cable or fiber-optic network. For example, computing device 115 may be any suitable computing device, such as a VoIP phone, skinny client control protocol (SCCP) phone, session initiation protocol (SIP) phone, IP phone, personal computer, softphone, workstation, terminal, server, etc. The telephony network 109 may include a circuit-switched network, such as the public switched telephone network (PSTN), an integrated services digital network (ISDN), a private branch exchange (PBX), or other like network. For instance, voice station 119 may be any suitable plain old telephone service (POTS) device, facsimile machine, etc. Meanwhile, the wireless network 111 may employ various technologies including, for example, code division multiple access (CDMA), long term evolution (LTE), enhanced data rates for global evolution (EDGE), general packet radio service (GPRS), mobile ad hoc network (MANET), global system for mobile communications (GSM), Internet protocol multimedia subsystem (IMS), universal mobile telecommunications system (UMTS), etc., as well as any other suitable wireless medium, e.g., microwave access (WiMAX), wireless fidelity (WiFi), satellite, and the like.

Although depicted as separate entities, the networks 107-113 may be completely or partially contained within one another, or may embody one or more of the aforementioned infrastructures. For instance, the service provider network 113 may embody circuit-switched and/or packet-switched networks that include facilities to provide for transport of circuit-switched and/or packet-based communications. It is further contemplated that the networks 107-113 may include components and facilities to provide for signaling and/or bearer communications between the various components or facilities of the system 100. In this manner, the networks 107-113 may embody or include portions of a signaling system 7 (SS7) network, Internet protocol multimedia subsystem (IMS), or other suitable infrastructure to support control and signaling functions.

Figure 2:
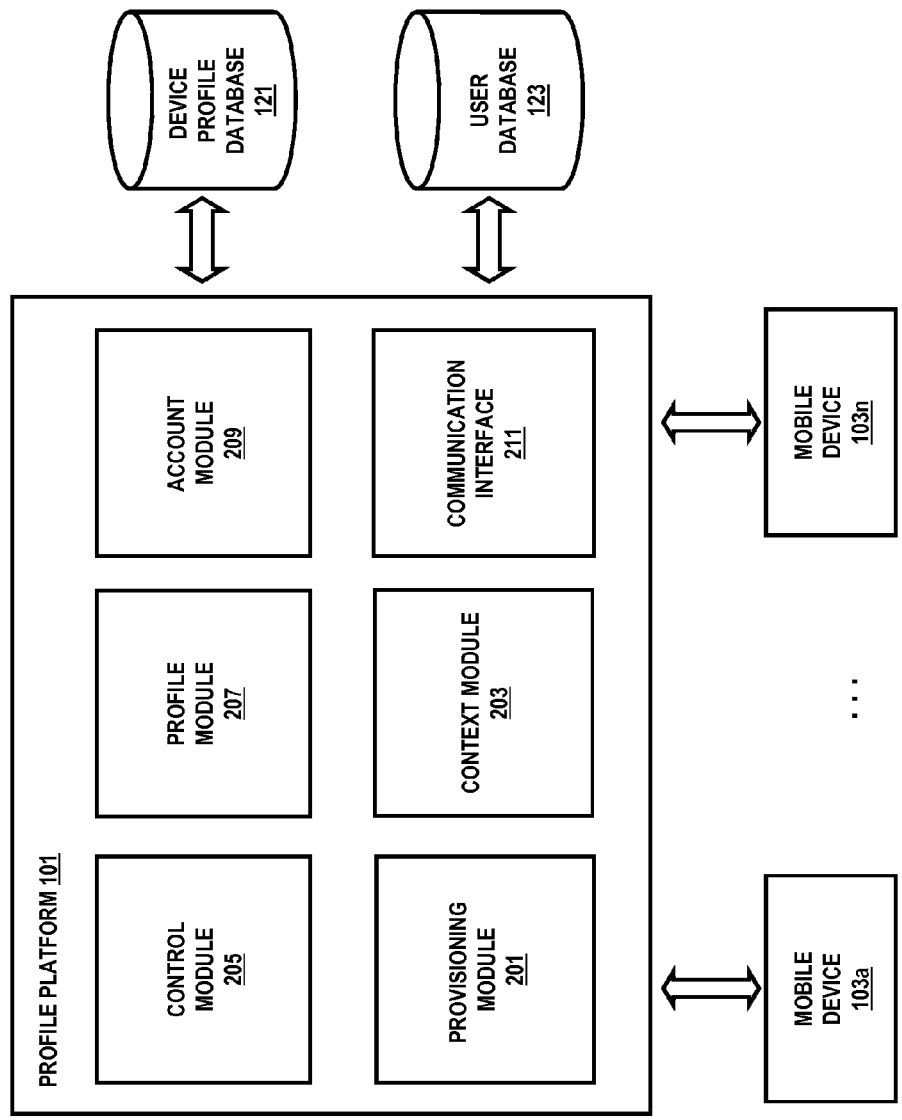
FIG. 2 is a diagram of the components of a profile platform, according to an exemplary embodiment.

FIG. 2 is a diagram of the components of a profile platform 101, according to an exemplary embodiment. The profile platform 101 may comprise computing hardware (such as described with respect to FIG. 6), as well as include one or more components configured to execute the processes described herein for providing cloud-based profile access of the system 100. It is contemplated that the functions of these components may be combined in one or more components or performed by other components of equivalent functionality. In one implementation, the profile platform 101 includes a provisioning module 201, context module 203, control module 205, profile module 207, account module 209, and communication interface 211.

The provisioning module 201 may deliver mobile content to the mobile device 103 to enable cloud-based profile access. The provisioning module 201 may also update, for example, the version, language settings, or type of installation for the profile platform 101.

The context module 203 may work with the mobile device 103 to determine the context data based on sensor information and the location information to enable the selection of a device profile 105. Context data may include information relating to, for example, a time of request, a detection of an event, a geolocation of the mobile device 103, presence management, a notification prompt, or a manual input. As noted, it is contemplated that the context module 203 may be implemented as an external server, for example, by NPS 127.

Context data relating to time of request may include, a time of day, day of the week, specific dates (e.g., calendar event) and the like. For example, the profile platform 101 may be configured to associate a device profile 105 with a schedule, which can indicate a period of time (e.g., 8 A.M. to 8 P.M., Monday-Friday) to activate or deactivate the device profile 105.

Moreover, the activation or deactivation can be event driven in addition to or in lieu of the schedule. Events may be determined by the profile platform 101 using information detected by sensors on the mobile device 103. For example, a mobile device 103 executing a fitness application that detects heart rate and pace may cause the profile platform 101 to maintain the device profile 105 based on the detected heart rate or pace. Additionally, or alternatively the profile platform 101 may maintain the device profile 105 until the fitness application is closed. Additionally, or alternatively, the profile platform 101 may be configured to associate the device profile 105 with a geolocation. The profile platform 101 may determine the geolocation using, for example, a location detection technology located on the mobile device 103 (e.g., GPS technology), and location detection technology located on the one or more networks 107-113 (e.g., cell site triangulation). Additionally, the profile platform 101 may determine the geolocation using the location of a network access point, for example, a WiFi router, or cell site. Moreover, profile platform 101 may also be configured to determine location by causing the mobile device 103 to detect a variety of technologies—i.e., near field communication (NFC), BLUETOOTH, infrared, etc. In this manner, a mobile device 103, may detect a communication containing information to permit the profile platform 101 to identify the geolocation.

Additionally, or alternatively, the profile platform 101 may use presence information to select the device profile 105. By way of example, a user may publish a presence state (e.g., at the office); this state information can be supplied to the profile platform 101 to retrieve an appropriate device profile 105 (e.g., office profile) for the determined presence state.

In yet another example, the profile platform 101 may be configured to associate a device profile 105 using a notification prompt to enable the selection of a device profile 105. For example, the profile platform 101 may detect a location and cause the mobile device 103 to display a notification to the user of the detected location and the selected device profile 105. The notification may allow the user to close an application or save data associated with the device profile 105 currently in use by mobile device 103 before causing the change in device profile 105. Additionally, the prompt may request a user input to confirm the change to the selected device profile 105. The notification may include a list of device profiles; such notification message cause the mobile device 103 to detect a user input to specify one of the profiles. Additionally, or alternatively, the profile platform 101 may be configured to directly receive the user input pertaining to the profile selection.

According to one embodiment, profile platform 101 may include a control module 205 for configuring the mobile device 103 to execute a device profile. Also, the control module 205 can generate a control message that specifies the device profile determined or otherwise selected by the context module 203. The selected device profile 105 regulates access to data and associated applications. For example, a control message can be produced by control module 205, such that the message indicates the selected device profile (e.g., school profile, work profile, home profile, etc.).

According to one embodiment, profile platform 101 may include a profile module 207 configured to generate templates for specifying applications and data associated with the respective device profiles. In one embodiment, the profile module 207 can provide users with the capability to create these templates, which contain information relating to the profile. Template information may include, for example, organization data, structure information, preferences, contacts, layout information, and etc. The profile module 207 may also coordinate storage of the template information and device profile in profile database 121. Additionally, functions performed by the profile module 207 may be implemented as an external server, for example, by NSS 125.

It is contemplated that the template information may be device agnostic, and therefore can be used by a multitude of different hardware, and software platforms. The profile module 207 may be configured to detect and incorporate changes to the template into device profiles 105 associated with the template. For example, the profile module 207 may be configured to detect changes in template information that allows access to an application, and cause device profiles associated with the template information to allow access to the application.

Additionally, or alternatively the profile module 207 may be configured to execute applications to enable a cloud exclusive mode. For example, a user may logon to a mobile device 103 and access a device profile 105 without causing the profile platform 101 to replicate the device profile 105 onto the mobile device 103.

According to one embodiment, profile platform 101 may include an account module 209 for managing user and group accounts. Account module 209 may be configured to enable users to add and remove mobile devices 103, data, and applications associated with the user account. Likewise, account module 209 may be configured to generate a template key associated with a group account to enable group users the ability to add and remove, user accounts, data, and applications associated with the group account.

The profile platform 101 may further include a communication interface 211 to communicate with other components of the profile platform 101, the mobile devices 103, and other components of system 100. The communication interface 211 may include multiple means of communication. For example, the communication interface 211 may be able to communicate over short message service (SMS), multimedia messaging service (MMS), internet protocol, instant messaging, voice sessions (e.g., via a phone network), email, or other types of communication. Additionally, communication interface 211 may include a web portal accessible by, for example, mobile device 103, computing device 115 and the like.

It is contemplated that to prevent the unauthorized access, profile platform 101 may include an authentication identifier when transmitting signals to mobile devices 103. For instance, control messages may be encrypted, either symmetrically or asymmetrically, such that a hash value, for instance, can be utilized to authenticate received control signals, as well as ensure that those signals have not been impermissibly altered in transit. As such, communications between the mobile devices 103 and profile platform 101 may include various identifiers, keys, random numbers, random handshakes, digital signatures, and the like.

FIG. 3 is a flowchart of a process for providing cloud-based profile access, according to an exemplary embodiment. For illustrative purpose, process 300 is described with respect to the system of FIG. 1. It is noted that the steps of process 300 may be performed in any suitable order, as well as combined or separated in any suitable manner. In step 301, the profile platform 101 receives a request for a device profile. By way of example, such request can be triggered by the user manually (or automatically) upon encountering a different environment. The profile platform 101 may then, as in step 303, retrieve or otherwise determine context data for the mobile device 103 to determine the device profile. For example, the user can be leaving a place of employment to home, whereby the location (or context data) of the user is tracked based on movement of mobile device 103a—e.g., a GPS-enabled cellular phone. At this point, the device 103a may initially be executing a work profile, in which certain work-related applications are activated. Additionally, the work profile would permit the user to access certain data that may reside within the mobile device 103a or on a corporate network.

As part of subscription to the cloud-based service, device 103a may monitor certain events or sensor information to determine the environment in which the device 103a is in, and retrieve an appropriate profile. Accordingly, a request is generated by mobile device 103 to either obtain the profile from platform 101, or receive instructions from platform 101 to activate a different profile (e.g., home profile or recreational profile) that is already resident on the mobile device 103. It is contemplated that the request may originate from other devices not associated with the user. For example, the user has an employer that utilizes a system (e.g., server) to monitor whether the user is within the employer's premise; the system may initiate the profile change by issuing the request to the platform 101.

By way of example, the context data may include environmental information or parameters, for example, relating to a time of request, geolocation of the mobile device, activities in which the user is engaged in (as evident from certain actions of the mobile device 103a), or a combination thereof.

In step 305, the profile platform 101 may select a device profile from among various profiles the user has specified or otherwise defined based on the determined context data. These profiles may be designated by the user as part of the subscription process, and updated periodically. It is contemplated that one or more of the device profiles may be designated as a group profile, which is deployed to devices sharing a common trait or interest; all devices participating in an event—e.g. attendance at a concert, party, or sporting event. Once the device profile is selected, the profile platform 101 may, as in step 307, generate a control message specifying the device profile 105a for configuring the mobile device 103a. For example, the control message may specify a template key for accessing at least one application.

Once the control message is generated, the profile platform 101 may, as in step 309, determine whether the mobile device 103a, in adapting the selected device profile 105a, includes one or more applications specific to the selected device profile 105a. By way of example, the device profile 105a may include access to a sports statistics application that is specific to a sporting event profile for generating or tracking statistical data for the event. Once the determination is completed, the profile platform 101 may, as in step 311, forward a template including the one or more applications and associated data for the applications to the mobile device 103 (if the mobile device 103a does not include the one or more applications). By way of example, the profile platform 101 may forward a template including the statistics application specific.

It is contemplated that the user may manage certain aspects of the cloud-based profile access service using other devices. In step 313, the profile platform 101 may execute a logon procedure to access the cloud-based profile access service by computing device 115 or mobile device 103. After authenticating the computing device 115 or mobile device 103, the profile platform 101 may, as in step 315, determine that mobile device 103n is associated with an account of the user of the mobile device 103a as well. Next, the profile platform 101 may, as in step 317, provide the other mobile device 103n with one of the device profiles corresponding to the mobile device 103a. Under this scenario, mobile device 103n may be a different device, e.g., a tablet computer or a laptop.

In step 319, platform 101 generates another control message to remove the data associated with the device profile 105a from mobile device 103a. By way of example, after the sporting event, the platform 101 may generate another control message to remove the sports statistics application associated with the sporting event profile.

Although the above process is described in the context of a sporting event, it is contemplated that the process has applicability to any event and other environments. As explained below, users may routinely transition from a work environment to a different environment, such as home.

Figure 4A:
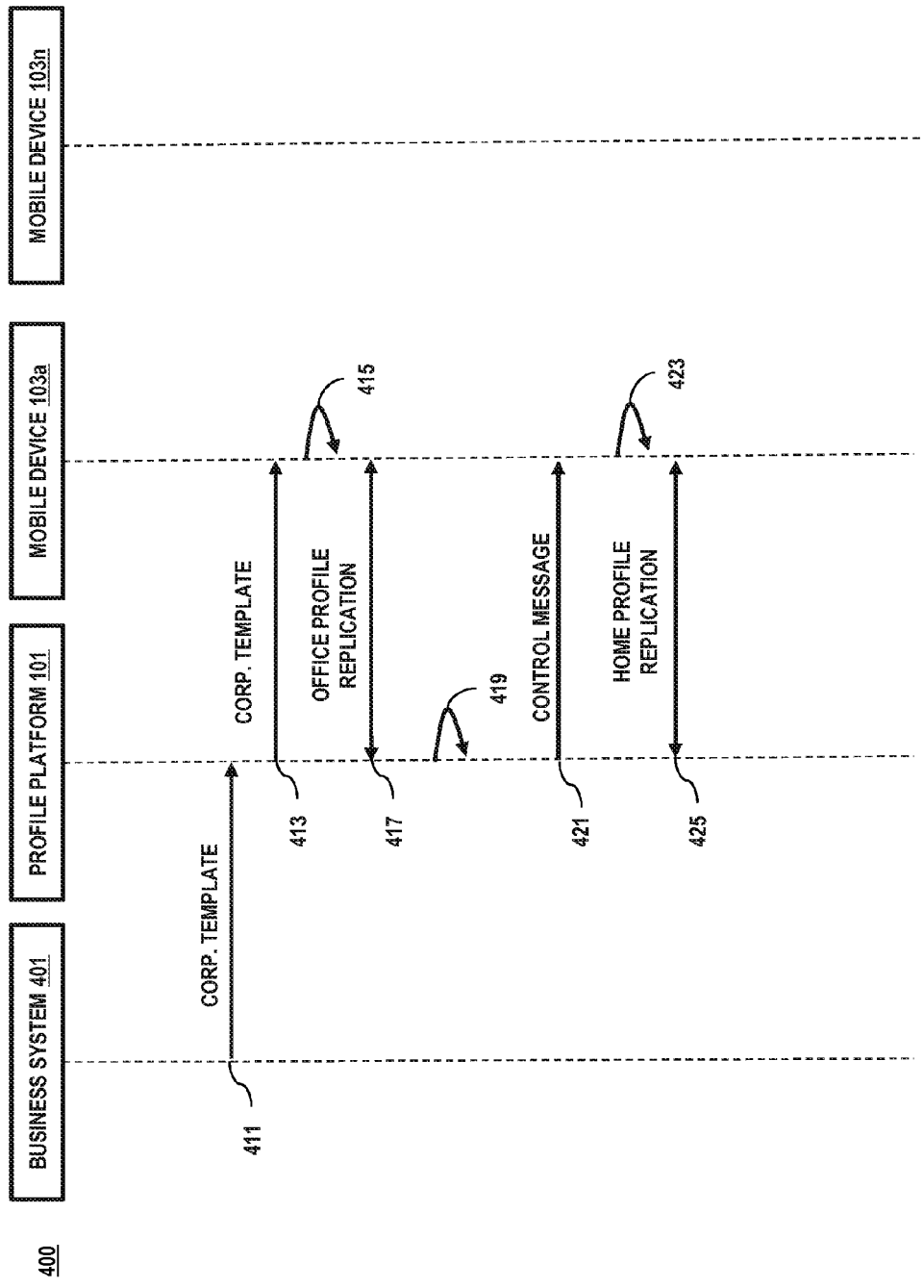

FIGS. 4A and 4B are ladder diagrams of a process for accessing a profile, according to an exemplary embodiment. For illustrative purpose, process 400 is described with respect to the system of FIG. 1, whereby the mobile devices may be computing devices (e.g., a laptop) that an employer seeks to control as part of corporate security measures. It is noted that the steps of process 400 may be performed in any suitable order, as well as combined or separated in any suitable manner. In this example, business system 401 creates a template to be associated with a corporate profile. Under this scenario, the cloud (as provided by platform 101) can utilize a server-based approach—e.g., NPS 127, to process the various datum to determine which profile or profiles should be active and NSS 125 to store the profiles and to distribute the profile information. It is also assumed that mobile devices 103 are configured to support creation and maintenance of user profiles. For example, the profiles may be created and/or modified using the devices 103 themselves or through other devices, such as computing device 115 (e.g., desktop computer, laptop, etc.).

Once the template is created, the template can be sent, as in step 411, to the profile platform 101 for storage and processing. It is contemplated that the template, in certain embodiments, may be forwarded with information indicating authorized user accounts. That is, the business system 401 can grant the employee access to the corporate template through the platform 101 (specifically, NPS 127 in this example). The profile platform 101 then transmits (or pushes), as in step 413, the corporate template to mobile device 103a. It is contemplated that mobile device 103a is associated with a user account authorized by the corporate account. According to one embodiment, the template can also be forwarded with a template key, a control message and the device profile (e.g., office profile) associated with the template.

Once the mobile device 103a receives the template, template key, control message, and office profile, the mobile device 103a detects, as in step 415, input causing a change to the office profile. The profile platform 101 then replicates, as in step 417, the office profile to enable cloud-based profile access.

Once the office profile is replicated on the profile platform 101, the profile platform 101 determines, as in step 419, that the mobile device 103a has moved beyond a designated office area and selects, in this example, a home profile for the mobile device 103a. The profile platform 101 then generates, as in step 421, a control message specifying the selection of the home profile for transmission to the mobile device 103a. Upon the mobile device 103a receiving the control message, mobile device 103a changes, as in step 423, the device profile 105a from an office profile to a home profile. As mentioned, if the particular profile is already loaded or resident on the device 103a, the control message may simply instruct the device 103a to activate the new profile and de-activate the former profile. The profile platform 101 then performs profile replication, as in step 425, to essentially transfer the office profile onto mobile device 103a.

The profile platform 101 then receives, as in step 427, logon information from mobile device 103n to authenticate that the user of mobile device 103n is associated with the user account of mobile device 103a. By way of example, mobile device 103n may replace mobile device 103a as an upgraded mobile device 103. It is contemplated that mobile device 103n may be a temporary substitute for mobile device 103a where applications are executed on the profile platform 101. Once the authenticating information is received, the profile platform 101 sends, as in step 429, the corporate template, template key, control message and the office profile previously available on mobile device 103a. The profile platform 101 also sends, as in step 431, a control message to mobile device 103a that removes data and applications to prevent unauthorized access to data and applications included in the office profile.

In addition to manipulating individual profiles, profile platform 101 can define and populate group profiles to one or more mobile devices 103. In effect, this profile is applied to a community of devices 103a-103n, as next discussed.

FIG. 5 is a flowchart of a process using a group profile to prevent access to applications, according to an exemplary embodiment. For illustrative purpose, process 500 is described with respect to the system of FIG. 1. It is noted that the steps of process 500 may be performed in any suitable order, as well as combined or separated in any suitable manner. In step 501, the profile platform 101 generates a control message specifying a device profile 105 to be related to a school environment. With a school profile, the mobile device 103 can be prevented from accessing certain applications and/or data that pertain to a different profile, e.g., home profile. By way of example, the profile platform 101 may determine that school has started, or that the mobile device 103 is resident in a designated school area. Once the profile platform 101 generates the control message, the platform 101 allows, as in step 503, access only to applications and data approved by the school template. By way of example, the school administration may wish to restrict gaming applications, but allow educational applications used in class. Group applications may also be utilized, such as a group chat, which allows students to discuss topics with the teacher and other students. In step 505, the school profile can be replicated to the cloud-based platform 101. It is contemplated that the replication may be accomplished using one or more networks 107-113, such as a wireless network (e.g., WiFi system) operated by the school; this permits the transfer of the profile using, e.g., the WiFi connection.

In step 507, a request is received from user account (e.g., teacher account) associated with the school template. Once the profile platform 101 receives the request, it forwards, as in step 509, from the cloud-based platform (e.g., profile platform 101), the replicated school profile including associated data such as, for example, homework assignments, etc. By way of example, access may be to the entire school profile or a portion of the school profile such as, for example, a homework directory. In step 511, the profile platform 101 receives, from the teacher account, associated data (e.g., graded homework assignments) and can add the data to the school profile. Next, the profile platform 101 replicates, as in step 513, the school profile onto the mobile device 103.

From the above discussion, numerous advantages are provided by the various embodiments. For instance, access to applications and data can be streamlined for the users, depending on the particular environment. Also, recovery of information can be readily performed. In addition, data security is enhanced.

The processes described herein for providing cloud-based profile access may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 6:
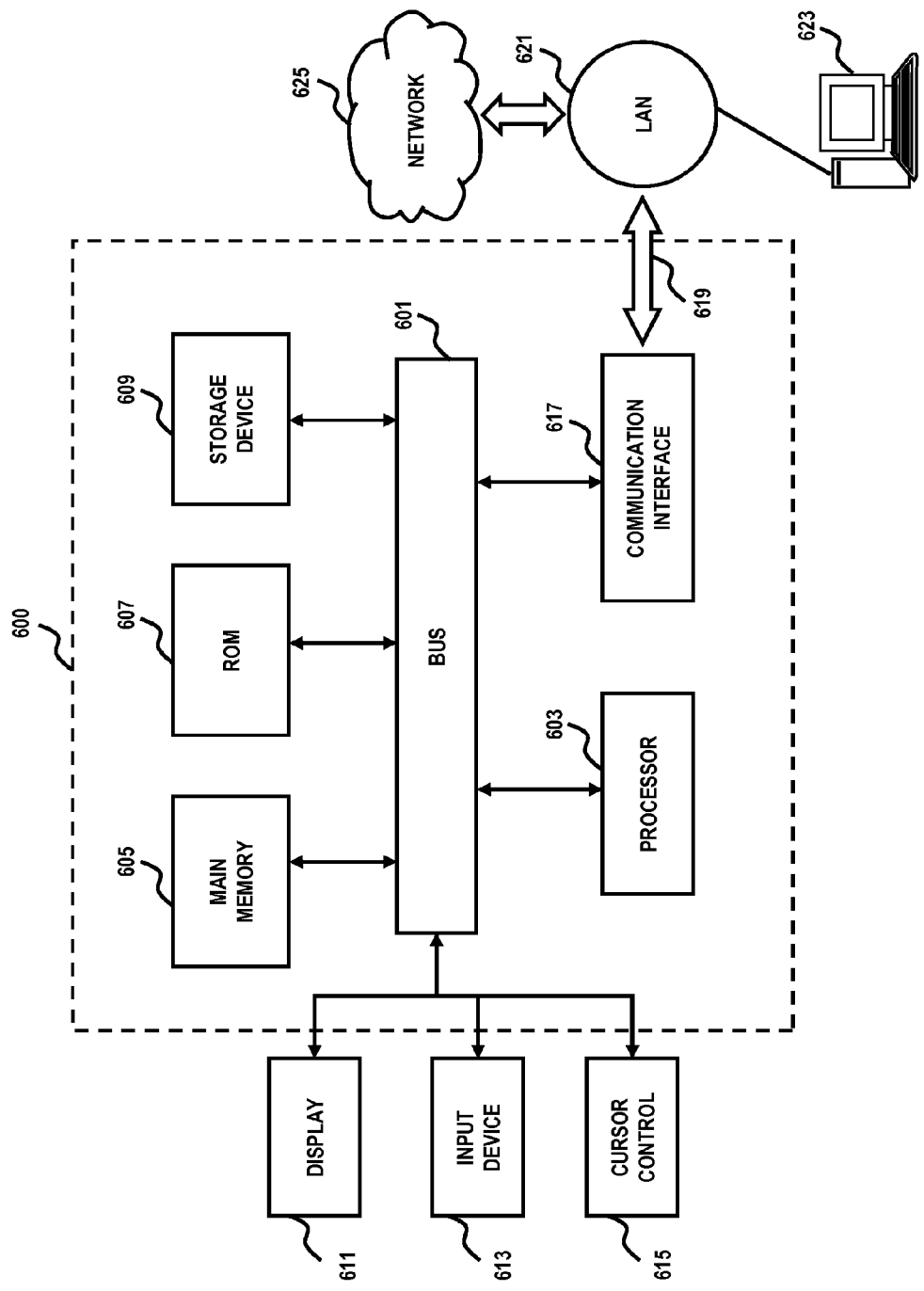
FIG. 6 is a diagram of a computer system that can be used to implement various exemplary embodiments.

FIG. 6 is a diagram of a computer system that can be used to implement various exemplary embodiments. The computer system 600 includes a bus 601 or other communication mechanism for communicating information and one or more processors (of which one is shown) 603 coupled to the bus 601 for processing information. The computer system 600 also includes main memory 605, such as a random access memory (RAM) or other dynamic storage device, coupled to the bus 601 for storing information and instructions to be executed by the processor 603. Main memory 605 can also be used for storing temporary variables or other intermediate information during execution of instructions by the processor 603. The computer system 600 may further include a read only memory (ROM) 607 or other static storage device coupled to the bus 601 for storing static information and instructions for the processor 603. A storage device 609, such as a magnetic disk, flash storage, or optical disk, is coupled to the bus 601 for persistently storing information and instructions.

The computer system 600 may be coupled via the bus 601 to a display 611, such as a cathode ray tube (CRT), liquid crystal display, active matrix display, or plasma display, for displaying information to a computer user. Additional output mechanisms may include haptics, audio, video, etc. An input device 613, such as a keyboard including alphanumeric and other keys, is coupled to the bus 601 for communicating information and command selections to the processor 603. Another type of user input device is a cursor control 615, such as a mouse, a trackball, touch screen, or cursor direction keys, for communicating direction information and command selections to the processor 603 and for adjusting cursor movement on the display 611.

According to an embodiment of the invention, the processes described herein are performed by the computer system 600, in response to the processor 603 executing an arrangement of instructions contained in main memory 605. Such instructions can be read into main memory 605 from another computer-readable medium, such as the storage device 609. Execution of the arrangement of instructions contained in main memory 605 causes the processor 603 to perform the process steps described herein. One or more processors in a multi-processing arrangement may also be employed to execute the instructions contained in main memory 605. In alternative embodiments, hard-wired circuitry may be used in place of or in combination with software instructions to implement the embodiment of the invention. Thus, embodiments of the invention are not limited to any specific combination of hardware circuitry and software.

The computer system 600 also includes a communication interface 617 coupled to bus 601. The communication interface 617 provides a two-way data communication coupling to a network link 619 connected to a local network 621. For example, the communication interface 617 may be a digital subscriber line (DSL) card or modem, an integrated services digital network (ISDN) card, a cable modem, a telephone modem, or any other communication interface to provide a data communication connection to a corresponding type of communication line. As another example, communication interface 617 may be a local area network (LAN) card (e.g. for Ethernet™ or an Asynchronous Transfer Mode (ATM) network) to provide a data communication connection to a compatible LAN. Wireless links can also be implemented. In any such implementation, communication interface 617 sends and receives electrical, electromagnetic, or optical signals that carry digital data streams representing various types of information. Further, the communication interface 617 can include peripheral interface devices, such as a Universal Serial Bus (USB) interface, a PCMCIA (Personal Computer Memory Card International Association) interface, etc. Although a single communication interface 617 is depicted in FIG. 6, multiple communication interfaces can also be employed.

The network link 619 typically provides data communication through one or more networks to other data devices. For example, the network link 619 may provide a connection through local network 621 to a host computer 623, which has connectivity to a network 625 (e.g. a wide area network (WAN) or the global packet data communication network now commonly referred to as the "Internet") or to data equipment operated by a service provider. The local network 621 and the network 625 both use electrical, electromagnetic, or optical signals to convey information and instructions. The signals through the various networks and the signals on the network link 619 and through the communication interface 617, which communicate digital data with the computer system 600, are exemplary forms of carrier waves bearing the information and instructions.

The computer system 600 can send messages and receive data, including program code, through the network(s), the network link 619, and the communication interface 617. In the Internet example, a server (not shown) might transmit requested code belonging to an application program for implementing an embodiment of the invention through the network 625, the local network 621 and the communication interface 617. The processor 603 may execute the transmitted code while being received and/or store the code in the storage device 609, or other non-volatile storage for later execution. In this manner, the computer system 600 may obtain application code in the form of a carrier wave.

The term "computer-readable medium" as used herein refers to any medium that participates in providing instructions to the processor 603 for execution. Such a medium may take many forms, including but not limited to computer-readable storage medium ((or non-transitory)—i.e., non-volatile media and volatile media), and transmission media. Non-volatile media include, for example, optical or magnetic disks, such as the storage device 609. Volatile media include dynamic memory, such as main memory 605. Transmission media include coaxial cables, copper wire and fiber optics, including the wires that comprise the bus 601. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the embodiments of the invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

Figure 7:
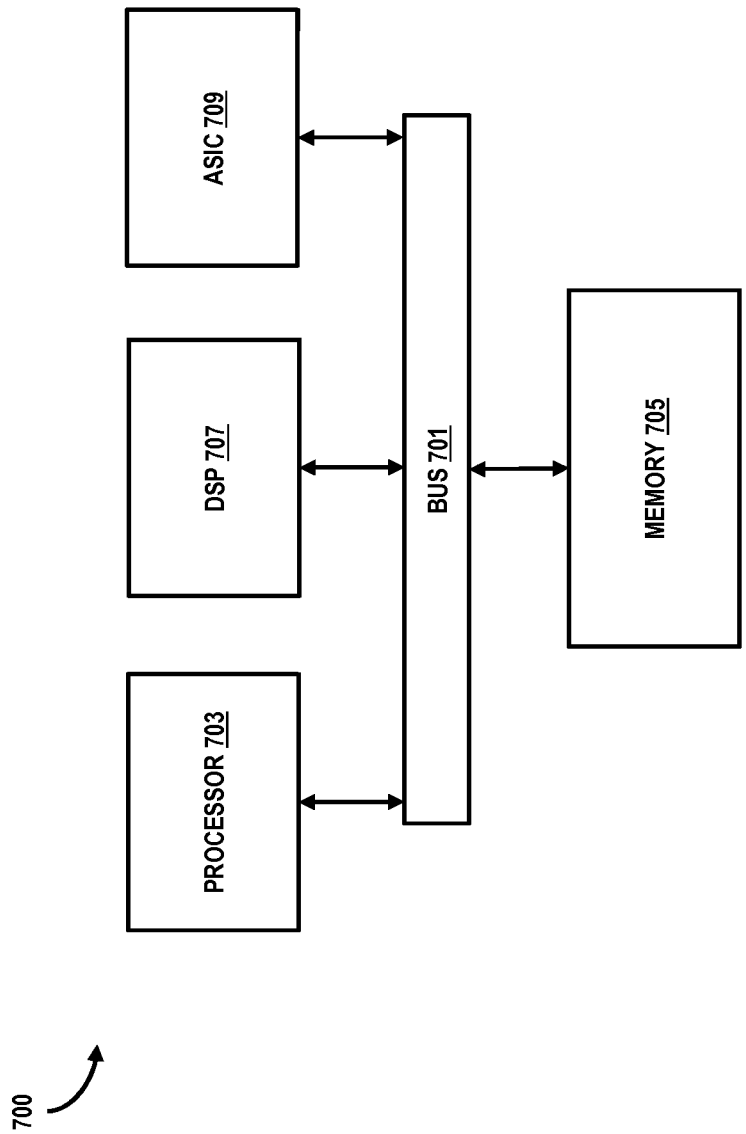
FIG. 7 is a diagram of a chip set that can be used to implement an embodiment of the invention.

FIG. 7 illustrates a chip set or chip 700 upon which an embodiment of the invention may be implemented. Chip set 700 is programmed to enable cloud-based profile access as described herein and includes, for instance, the processor and memory components described with respect to FIG. 6 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 700 can be implemented in a single chip. It is further contemplated that in certain embodiments the chip set or chip 700 can be implemented as a single "system on a chip." It is further contemplated that in certain embodiments a separate ASIC would not be used, for example, and that all relevant functions as disclosed herein would be performed by a processor or processors. Chip set or chip 700, or a portion thereof, constitutes a means for performing one or more steps of enabling the management of device profiles.

In one embodiment, the chip set or chip 700 includes a communication mechanism such as a bus 701 for passing information among the components of the chip set 700. A processor 703 has connectivity to the bus 701 to execute instructions and process information stored in, for example, a memory 705. The processor 703 may include one or more processing cores with each core configured to perform independently. A multi-core processor enables multiprocessing within a single physical package. Examples of a multi-core processor include two, four, eight, or greater numbers of processing cores. Alternatively or in addition, the processor 703 may include one or more microprocessors configured in tandem via the bus 701 to enable independent execution of instructions, pipelining, and multithreading. The processor 703 may also be accompanied with one or more specialized components to perform certain processing functions and tasks such as one or more digital signal processors (DSP) 707, or one or more application-specific integrated circuits (ASIC) 709. A DSP 707 typically is configured to process real-world signals (e.g., sound) in real time independently of the processor 703. Similarly, an ASIC 709 can be configured to performed specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

In one embodiment, the chip set or chip 700 includes merely one or more processors and some software and/or firmware supporting and/or relating to and/or for the one or more processors.

The processor 703 and accompanying components have connectivity to the memory 705 via the bus 701. The memory 705 includes both dynamic memory (e.g., RAM, magnetic disk, writable optical disk, etc.) and static memory (e.g., ROM, CD-ROM, etc.) for storing executable instructions that when executed perform the inventive steps described herein to enable cloud-based profile access. The memory 705 also stores the data associated with or generated by the execution of the inventive steps.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A method comprising:
    receiving, at a cloud-based service platform, a request for a device profile from a mobile device, wherein the request is triggered by one or more changes to context of the mobile device as indicated in a schedule or calendar stored in the mobile device, as detected by one or more sensors of the mobile device, or a combination thereof;
    selecting one of a plurality of device profiles based on the request, wherein each of the plurality of device profiles specifies a template key, a respective configuration of a graphical user interface associated with the mobile device and one or more respective applications associated with the mobile device, wherein the template key corresponds to one of a plurality of templates each of which includes one or more applications specific to the device profile, and the template key is configured to be used across competing mobile operating systems of a plurality of manufacturers;
    generating a control message specifying the selected device profile for configuring the mobile device;
    transmitting the control message to the mobile device and forwarding the one template from the cloud-based service platform to the mobile device when the mobile device does not include the one or more applications, wherein the mobile device is configured to deactivate an active device profile and to activate the selected device profile according to the template and the control message.

2. A method according to claim 1, wherein the context data relates to an environmental setting of the mobile device, the environmental setting corresponds to one of the device profiles, and the method further comprises:
    storing, at the cloud-based service platform, the selected device profile;
    replicating, by the cloud-based service platform, the selected device profile to the mobile device according to the control message;
    receiving, at the cloud-based service platform, an indication of a change to the replicated device profile; and
    replicating the change to the selected device profile stored at the cloud-based service platform.

3. A method according to claim 2, wherein the environmental setting relates to a time of the request, a geolocation of the mobile device, or a combination thereof.

4. A method according to claim 1, wherein the one or more changes to context are detected by one or more sensors for a heart rate, and
    the selected device profile prevents access to one or more applications of at least one of the device profiles and the selected profile is resident on the mobile device prior to the selecting of the plurality of device profiles.

5. A method according to claim 1, wherein the template key includes a structure of information authorizing access to the one or more applications and data associated with the template key.

6. A method according to claim 5, further comprising:
    generating another control message to remove the associated data from the mobile device.

7. A method according to claim 1, wherein one of the device profiles is designated as a group profile and is provided to a plurality of mobile devices including the mobile device, and each of the mobile devices individually determines attending a group event and sends to the cloud-based service platform a request for the group profile.

8. A method according to claim 1, wherein the mobile device is associated with a user account, the method further comprising:
    executing a logon procedure to the cloud-based service platform by another mobile device; and
    determining that the other mobile device is operated by a user associated with the user account, wherein the other mobile device is provided with one of the device profiles corresponding to the mobile device.

9. A method according to claim 7, wherein the control message further specifies a profile key for accessing at least one application, and the group event includes a concert, a party, a sporting event, a school event, an exercise event, a travel event, a work event, or a combination thereof.

10. An apparatus comprising:
at least one processor; and
at least one memory including computer program code for one or more programs,
the at least one memory and the computer program code configured to, with the at least one processor, cause the apparatus to perform at least the following,
receive, at a cloud-based service platform, a request for a device profile from a mobile device, wherein the request is triggered by one or more changes to context of the mobile device as indicated in a schedule or calendar stored in the mobile device, as detected by one or more sensors of the mobile device, or a combination thereof;
select one of a plurality of device profiles based on the request, wherein each of the plurality of device profiles specifies a template key, a respective configuration of a graphical user interface associated with the mobile device and one or more respective applications associated with the mobile device, wherein the template key corresponds to one of a plurality of templates each of which includes one or more applications specific to the device profile, and the template key is configured to be used across competing mobile operating systems of a plurality of manufacturers;
generate a control message specifying the selected device profile for configuring the mobile device;
transmit the control message to the mobile device, wherein the mobile device is configured to deactivate an active device profile and to activate the selected device profile according to the control message; and
forward the one template from the cloud-based service platform to the mobile device when the mobile device does not include the one or more applications, wherein the mobile device is configured to deactivate an active device profile and to activate the selected device profile according to the template and the control message.

11. An apparatus according to claim 10, wherein the context data relates to environmental setting of the mobile device, and the environmental setting corresponds to one of the device profiles.

12. An apparatus according to claim 11, wherein the environmental setting relates to a time of the request.

13. An apparatus according to claim 10, wherein the selected device profile prevents access to one or more applications of at least one of the device profiles.

14. An apparatus according to claim 10, wherein the template key includes a structure of information authorizing access to the one or more applications and data associated with the template key.

15. An apparatus according to claim 14, wherein the apparatus is further caused to:
generate another control message to remove the associated data from the mobile device.

16. An apparatus according to claim 10, wherein one of the device profiles is designated as a group profile and is provided to a plurality of mobile devices including the mobile device.

17. An apparatus according to claim 10, wherein the mobile device is associated with a user account, the apparatus is further caused to:
execute a logon procedure to the cloud-based service platform by another mobile device; and
determine that the other mobile device is operated by a user associated with the user account, wherein the other mobile device is provided with one of the device profiles corresponding to the mobile device.

18. An apparatus according to claim 10, wherein the control message further specifies a profile key for accessing at least one application.

19. A system comprising:
a cloud-based service platform configured to receive, by a processor, a request for a device profile from a mobile device, select one of a plurality of device profiles based on the request, wherein each of the plurality of device profiles specifies a template key, a respective configuration of a graphical user interface associated with the mobile device and one or more respective applications associated with the mobile device, wherein the template key corresponds to one of a plurality of templates each of which includes one or more applications specific to the device profile, and the template key is configured to be used across competing mobile operating systems of a plurality of manufacturers, transmit the control message to the mobile device, and forward the one template from the cloud-based service platform to the mobile device when the mobile device does not include the one or more applications, wherein the request is triggered by one or more changes to context of the mobile device as indicated in a schedule or calendar stored in the mobile device, as detected by one or more sensors of the mobile device, or a combination thereof, each of the plurality of device profiles specifies a respective configuration of a graphical user interface associated with the mobile device and one or more respective applications associated with the mobile device, and the mobile device is configured to deactivate an active device profile and to activate the selected device profile according to the template and the control message; and
a database configured to store associated data for the device profiles, and to store associated data for the applications.

20. A method according to claim 19, wherein the template key includes a structure of information authorizing access to the one or more applications and data associated with the template key.

* * * * *